Apr. 3, 1923. 1,450,508
D. MacPHEE
FISH CLEANING MACHINE
Filed Mar. 28, 1922  2 sheets-sheet 1
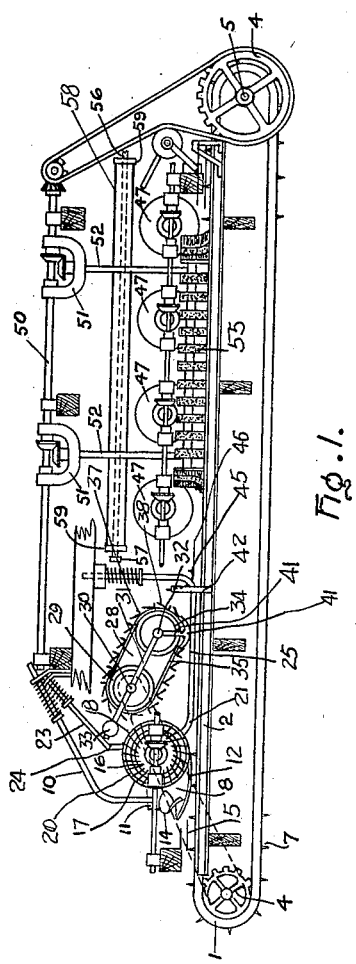
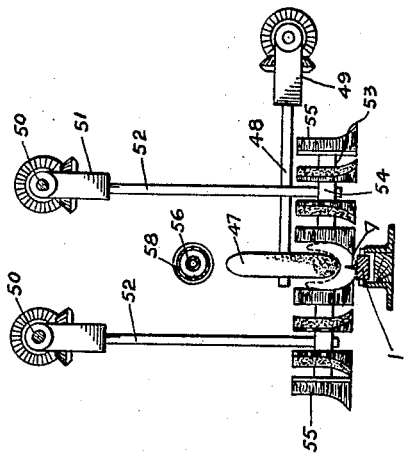
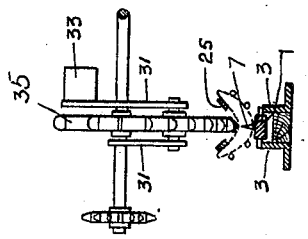
INVENTOR.
DOUGALD MAC PHEE
BY Fetherstonhaugh & Co
ATTORNEYS.

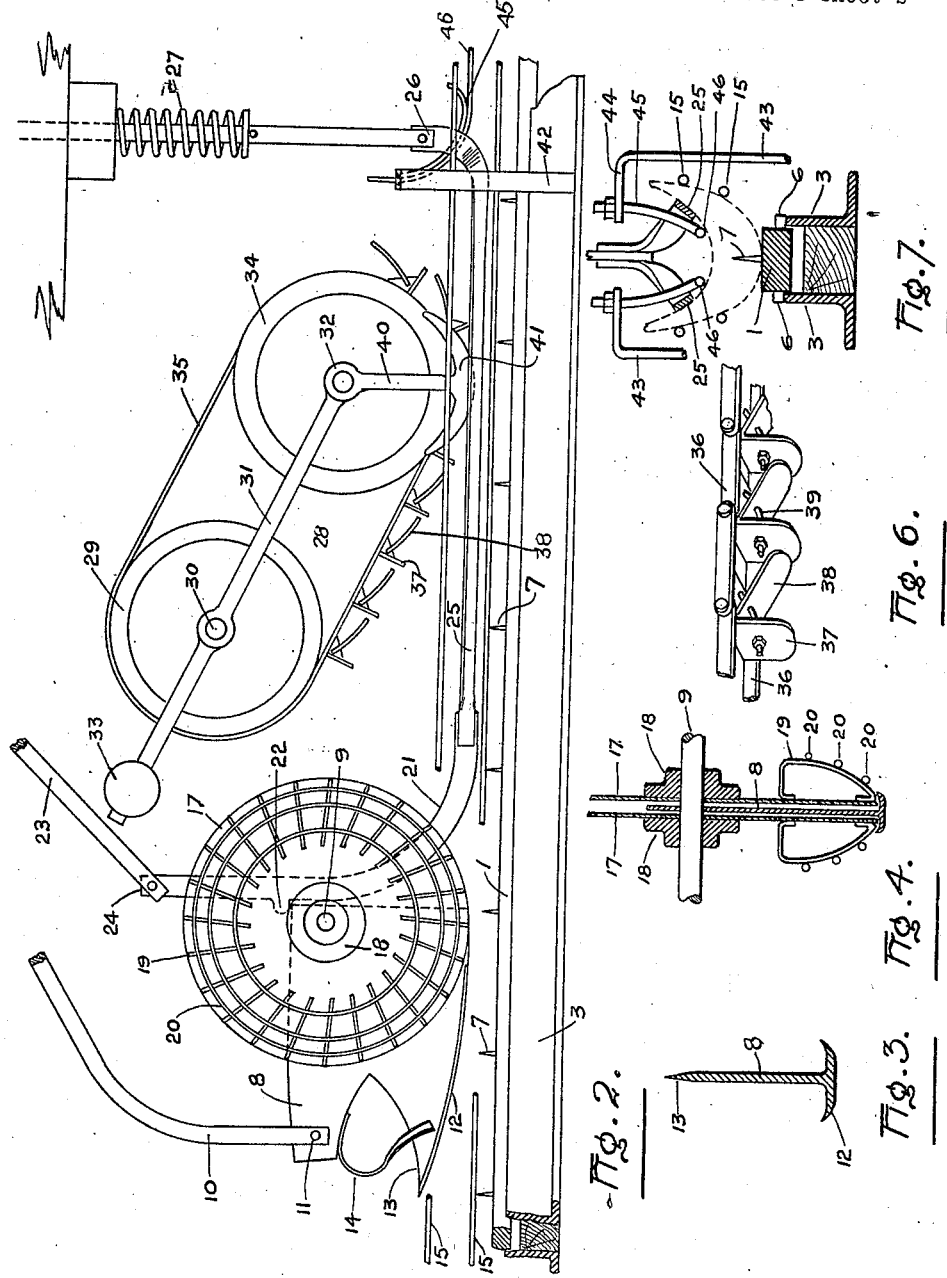

Patented Apr. 3, 1923.

1,450,508

UNITED STATES PATENT OFFICE.

DOUGALD MacPHEE, OF RIVERS INLET, BRITISH COLUMBIA, CANADA.

FISH-CLEANING MACHINE.

Application filed March 28, 1922. Serial No. 547,528.

*To all whom it may concern:*

Be it known that I, DOUGALD MACPHEE, a resident of the town of Rivers Inlet, in the Province of British Columbia, Canada, have invented certain new and useful Improvements in Fish-Cleaning Machines, of which the following is the specification.

My invention relates to a machine designed for the purpose of the cutting open of fish, removing of its entrails, cleaning out the belly and removing the blood vein of the fish which is situated along the vertebræ thereof, and also for the purpose of washing and scouring the inside and outside of the fish, leaving it ready for canning and cooking.

My invention is simple in design and effective in operation and consists of the following essential parts.

An endless conveyor on which the fish to be cleaned is transported past its various cleaning devices a gutter straddling a splitting knife on which is mounted a spring, an endless chain vertebrae scraper mounted on a pair of sprockets, a pair of spreaders to keep the scrapers from tearing the sides of the fish, spreader guides to hold the fish open whilst passing from one tool to another and to retain the fish in position on the conveyor chain, a plurality of inner and outer guide wires held taut between standards mounted on the bed of the machine the inner wires holding the fish on the conveyor and open for the reception of the various tools and the outer wires for the purpose of holding the fish in close contact with the various cleaning tools as will be more fully explained hereinafter.

A plurality of rotary brushes adjustably mounted for scouring the inside of the fish and a plurality of brushes mounted on endless belts adjustable for closure upon the sides of the fish for scouring the outside of the fish and removing loose scales.

A washing spray disposed above the brushes comprising a perforated high pressure pipe within a closed end pipe of larger diameter having a plurality of small holes bored along its underside.

All the cleaning mechanisms are provided with spring or other means for adjusting them to the desired contact with the fish to be cleaned as will appear later.

Fig. 1 is a longitudinal view of machine showing general arrangement of working parts.

Fig. 2 an enlarged longitudinal view of gutting and scraper mechanism.

Fig. 3 an enlarged cross section of knife.

Fig. 4 an enlarged cross section of rotary gutting wheel.

Fig. 5 an end view of scraper chain.

Fig. 6 a perspective view of scraper chain.

Fig. 7 a cross section of conveyor, spreader bars and guide wires.

Fig. 8 an end view of scouring mechanisms.

In the drawings like characters of reference indicate corresponding parts in each figure.

1 is an endless conveyor chain passing along a bed 2 comprising a pair of angle irons extending from end to end of the machine, the conveyor chain passing over suitable sprockets 4 one of which is driven from the driving shaft 5 of the machine.

Chain 1 is formed with link pivots extending outside the outer links as at 6, Fig. 7, such pivots riding on the angle iron 3.

7 are spikes spaced equidistantly along the chain which are disposed to project above the surface of the chain on the bed to impail the back of the fish to be cleaned and carry it forward along bed 2 against the several cleaning tools.

A knife member, designated by the numeral 8, has its inner end fulcrumed on a shaft 9 and its outer end pivotally attached to the lower extremity of a spring tensioned rod 10, preferably at the point indicated by the numeral 11. The lower edge of the knife member is provided with oppositely directed ribs affording a shoe 12, while the forward vertical edge is recessed as shown to provide upper and lower projecting portions. The lower projection is sharpened to provide a cutting edge 13, while the upper projecting portion is provided with a depending spring 14 having its lower end bifurcated to straddle the said cutting edge 13, the bifurcations being bent in such manner as to dispose the outer extremities thereof substantially at an angle of 90 degrees with respect to one another in order to retain the soft skin of the belly of the fish in cutting contact with the edge 13.

The knife 8 being fulcrumed on shaft 9 and pressed downwards at its outer edge by rod 10 is caused to enter the fish above the backbone and ride along same, the shoe 12 preventing the knife from penetrating the bone and causing it to terminate its cut at the vent of the fish.

15 are guide wires run lengthwise of the conveyor 1 and on either side thereof, so positioned as to hold the fish from falling from the conveyor and hold the sides of the fish against the various inside cleaning devices.

16 is my gutting wheel which is driven by suitable gearing to rotate with the travel of the fish, is formed with two separate discs 17 see Fig. 4, attached to bosses 18 keyed to shaft 9, the discs are spaced apart to allow the knife member 8 to be fulcrumed between the two, secured to the outer surfaces of each disc and extending from the periphery inwards towards the centre are a plurality of wire bows 19 so shaped that they conform substantially to the surface of the belly of the fish. 20 represents a plurality of wire rings of varying diameters attached to the bows 19 and being concentric with the discs 17, the bows 19 and rings 20 of both discs forming a paddle like cage into whch the entrails of the fish penetrate and by which such entrails are removed from the belly and thrown clear of the fish.

21 is a flat bar curved towards the rear of the machine in its lower half, the upper extremity projecting upwardly above the gutting wheel 16, the bar is positioned between the gutting wheel discs 17 and is provided with a lug or stop 22 engageable with the top edge of knife member 8 to restrict its downward movement, the upper extremity of bar 21 being pivotally connected to a spring tensioned rod 23 as at 24 to keep the foot of bar down to the desired height above conveyor 1.

Attached to the foot of bar 21 are spreader bars 25 which are two in number, each being twisted at their extremities, the pair being separated substantially as shown in Fig. 7 to hold the fish open while travelling past the scraper mechanism, the rear ends of the spreader bars are brought together and connected to an upwardly turned bar 26 having a depressing spring 27 on its upper end.

28 Fig. 1, represents in general my scraper mechanism which is shown in detail in Fig. 2, 29 is a chain sprocket rotatably keyed upon shaft 30 which is journalled in fixed bearings, said shaft being driven by suitable gearing from the drive of the machine, fulcrumed upon shaft 30 is a frame 31 having bearings in its lower extremity as at 32, at the upper end of frame 31 is adjustably mounted a counter weight 33.

34 is a sprocket wheel whose shaft is journalled in bearings 32, the numeral 35 represents a scraper chain passing over sprockets 29 and 34 running against the direction of travel of the conveyor 1.

36 in Fig. 6 are the side links of my scraper chain between pairs of which are rigidly set vertical scrapers 37 which are rounded at their outer extremities, 38 are guard plates adjustably secured to scrapers or chain as at 39 to prevent the scraper blades from scraping beyond a predetermined depth.

40 see Fig. 2, is one of a pair of guard shoes rigidly secured to the lower extremity of frame 31 and depending vertically therefrom, which is formed with segmental member 41 at its lower extremity which protects the sides of the fish from coming into scraping contact with the scraper blades 37 or guard plates 38.

42 represents generally a pair of standards, Fig. 2 and shown in detail as 43 in Fig. 7 each having a vertical leg and an inwardly turned horizontal member 44 through which is bolted a curved holding wire 45.

46 are a pair of wires running horizontally from standards 43 to the back end of the machine and are so positioned as to retain the belly of the fish open during its passage under the several rotary brushes.

47 is one of a plurality of rotary brushes the scouring surface being on the periphery and being of a cross section to conform to the belly of the fish as held open by the guide wires 46.

I reserve the right to modify the internal scouring brushes by mounting a plurality of brushes on a belt conveyor running on sprockets lengthwise of the machine.

The brushes are each mounted upon a substantially horizontal shaft 48 journalled in a yoke 49 to provide for limited vertical movement of the rotary brush to conform to the varying sizes of fish passing through the machine the shaft 48 being rotated against the travel of the fish by suitable mitre gearing, etc., from the drive of the machine. 50 represents a pair of shafts running longitudinally of the machine and positioned above and to either side of the conveyor such shafts being driven by suitable mitre gearing.

51 is a plurality of yokes suspended from shafts 50 in the centre of each of which is dependingly journalled a substantially vertical shaft 52. 53 is a sprocket keyed to the lower extremity of shaft 52. 54 represents a pair of endless chains on which is mounted a plurality of brushes 55 the bristle surface curving outwardly towards the lower end of the brush, the upper portion of the bristle surface being substantially parallel to the back of the brush. The pair of sprockets rotated by either of the shafts 50 carries one endless chain and its plurality of brushes, the direction of rotation of the sprockets 53 being with the travel of the fish and approximately twice the speed. 56 is a water feed pipe connected to a suitable supply, its opposite end being capped as at 57, and running longitudinally within pipe 58 the pipe 56 is bored with a plurality of small holes spaced equidistantly along its entire enclosed length and is closed with a cap or plug at its inner end as at 57.

58 is a large bore pipe having closed ends 59 along the underside of pipe 58 is a plurality of small holes equidistantly spaced for the purpose of providing a series of streams of water at low pressure to impinge upon all the brushes, and upon the fish during its passage through the several brush surfaces.

Modification of the means of holding the fish against the gutting wheel may be had by the use of springs or rods instead of the wires herein described.

I will now briefly describe the operation of my invention. The fish to be cleaned are prepared by removing head, tail and dorsal fins and are then set head end first and back down into the spikes 7 of conveyor chain 1 by which it is carried between guide wires 15 entering upon knife 8 which is depressed by spring rod 10 that the shoe 12 will ride along the vertebræ of the fish, the knife edge 13 splitting open the fish at the belly, in order that the skin may be sharply cut it is held in contact with the knife edge by spring 14.

The curvature of shoe 12 follows the vertebræ of the fish, its tip slowly rising and finally passing out of the belly at the vent.

The flare of spring 14 besides holding the skin in cutting contact with the knife spreads the sides apart to allow the periphery of gutting wheel 16 to enter the open belly, the entrails of which are forced by the rotation of the wheel in between the wires 19 and 20, thereby tearing out the entrails and throwing them clear of the fish.

The fish then passes with its sides spread apart under the guide bars 25 which maintain the fish upon the conveyor 1 during its passage to and under the chain scrapers 37 which scrape from the vertebræ of the fish the blood clot which adheres somewhat firmly thereto, the side guard members meanwhile preventing any of the scraper bars from touching the sides of the fish and the adjustable guide plates 38 preventing the scraper blades from scraping beyond a predetermined depth.

The fish on passing from under the guard bars 25 pass under the inside guide wires 46 continuing thereunder and still between the outside guide wires 15 during the rest of its travel upon the conveyor 1.

The fish held open then runs under one of a plurality of rotary brushes 47 all of which rotate against the travel of the fish, all of which scour the inside of the fish while a spray of clean water is discharging onto all the brushes and the fish, the rotary brushes being adjustable for height above the conveyor do not exert damaging pressure upon the fish.

On passing the first rotary brush the fish passes between a pair of conveyors carrying the brushes 55 which automatically adjust themselves to the width of the fish, the brushes 55 travelling with the fish and against the lay of its scales remove any loose scales which are washed away by the continual spray of water herein before mentioned.

The fish on arriving at the end of its travel on the conveyor is dropped into a tank of water for inspection and grading.

What I claim as my invention is:

1. In a fish cleaning machine, the combination with an endless conveyor having means adapted to engage the back of the fish when set longitudinally of the conveyor, of a knife comprising a plate pivotally mounted at its rearward end adjacent to the top and having a pointed forward portion and an upwardly curved cutting edge extending therefrom adapted to enter the open end of the fish body when carried longitudinally by the conveyor to rip it longitudinally, a curved shoe like portion forming the bottom of the knife and extending from the point rearward in a downward curve, and means for supporting the forward end of the knife adapted to exert a downward pressure to resiliently hold the shoe against the back bone of the fish as the knife passes through the body.

2. In a fish cleaning machine, the combination with an endless conveyor and means for engaging the back of the fish to hold it in a longitudinal position upon the conveyor, of a guiding device between which the body of the fish travels, a knife supported above the conveyor and adapted to engage the open end of the fish to rip the belly longitudinally, means for spreading the sides of the fish open into contact with the guiding means as they are severed, a circular member mounted to revolve at each side of the rear portion of the knife and having its periphery revolving closely adjacent to the rear end of the knife body, and an open wire construction extending outwardly from the periphery of the circular members and inwardly towards the centre thereof to form entrail engaging means.

3. In a fish cleaning machine, the combination with an endless conveyor, and means for engaging the back of the fish to hold it in a longitudinal position upon the conveyor, of a guiding device between which the body of the fish travels, a knife supported above the conveyor and adapted to engage the open end of the fish to rip the belly longitudinally, means for spreading the side of the fish open against the guiding means as they are severed, a circular member mounted to revolve at each side of the rear portion of the knife and having its periphery revolving closely adjacent to the rear end of the knife body, an open wire construction extending outwardly from the periphery of the circular members and comprising a series of wires curved outwardly from the periphery of each circular member and radially inward towards the centre thereof, and annular holding wires connecting the aforesaid wires together.

4. In a fish cleaning machine, means for severing the belly of the fish as it travels longitudinally, means entering between the severed portions of the fish for automatically removing the entrails and comprising a circular device having radial wire members extending outwardly in an inward curve from the periphery of the circular device, and annular wires holding the aforesaid wires together.

5. In a fish cleaning machine, means for severing the belly of the fish longitudinally, means for removing the entrails from the severed fish, means for subsequently scraping blood clots from the interior of the fish and comprising an endless device adapted to revolve, scraping blades extending therefrom adapted to enter the open body of the fish and engage the back bone, means for holding the sides of the fish open as it passes the scraping means, such means comprising curved plate portions extending from each scraping blade, and means for adjusting the curved plates in an upward or downward direction.

6. In a device of the class described, a fish entrail remover comprising a circular rotary member, wires extending outwardly from the periphery of the member and curling inwardly and radially to fit the interior of an opened up fish, and means for engaging the wires together.

7. In a device of the class described, a fish carrier adapted to convey the fish body longitudinally, a knife comprising a sheet metal body supported to swing at one end and having an upwardly curved lower edge terminating in a point from which an upwardly curved cutting edge extends and a shoe carried upon the lower curved edge of the body, and means for exerting downward pressure upon the free end of the knife to carry the shoe when within the fish body against the back bone of the fish.

8. In a device of the class described, a fish scraping device comprising two revolving members, a flexible drive connection between the members scraping the blades extending outwardly from the flexible driving member, and means carried thereby adapted to bear against the interior of the fish to regulate the degree of contact of the scraping members with the interior of the fish.

9. A fish cleaning machine, the combination of a splitting knife, spaced disks mounted to revolve on opposite sides of said knife and entrail removing means carried by said disks.

10. In a fish cleaning machine, the combination of a splitting knife, a shaft pivotally supporting the knife at one end, pressure means at the opposite end of the knife for forcing the same downwardly, disks fixed to the shaft on opposite sides of the knife and entrail removal means carried by said disks.

11. In a fish cleaning machine, the combination of a splitting knife, a shaft pivotally supporting the knife at one end, a presser bar pivoted to the knife at the opposite end, a spring arranged to exert a downward pressure on the bar, a pair of disks fixed to the shaft on opposite sides of the knife and entrail removal means carried by said disks.

12. In a fish cleaning machine, a combination of a splitting knife pivoted at one end, means at the opposite end of the knife for exerting a downward pressure thereon and a stop engageable with the knife for limiting the extent to which the same is depressible.

13. In a fish cleaning machine, a cutting knife comprising a vertical plate provided with a cutting edge at one end and flanges projecting laterally from the plate along the lower edge thereof.

14. In a fish cleaning machine, a cutting knife comprising a vertical plate provided with a curved cutting edge at the forward end and a spring fastened to the plate provided with a bifurcated portion disposed to straddle the said cutting edge.

15. In a fish cleaning machine the combination of an endless scraper, a frame carrying the scraper, means pivotally mounting one end of the frame, and arcuate members depending from the frame at the opposite end.

16. In a fish cleaning machine, the combination of a fish carrier, a splitting knife, a shaft pivotally supporting the rear end of the knife, spring means at the forward end of the knife for depressing the same, a pair of disks fixed to said shaft to revolve therewith on opposite sides of the splitting knife, entrail removing means carried by said disks, a scraper positioned rearwardly of the disks, a pair of spreader bars positioned beneath and on opposite sides of the scraper, means at the ends of said bars for yieldably pressing the same toward the fish carrier and brushing means positioned rearwardly of the scraper and arranged to clean both the inner and outer portions of a fish.

Dated at Vancouver, B. C., this 6th day of March, 1922.

DOUGALD MacPHEE.

Witnesses:
J. J. JOHNSTON,
FREDERICK S. WEAVER.